United States Patent
Stürzer

(10) Patent No.: US 7,971,488 B2
(45) Date of Patent: Jul. 5, 2011

(54) FORCE MEASURING DEVICE FOR A PARKING BRAKE OF A VEHICLE, IN PARTICULAR OF A PASSENGER VEHICLE

(75) Inventor: Jürgen Stürzer, Aiterhofen (DE)

(73) Assignee: Continental Automotive GmbH, Hannover (DE)

( * ) Notice: Subject to any disclaimer, the term of this patent is extended or adjusted under 35 U.S.C. 154(b) by 398 days.

(21) Appl. No.: 12/293,879

(22) PCT Filed: Jan. 30, 2007

(86) PCT No.: PCT/EP2007/050861
§ 371 (c)(1),
(2), (4) Date: Dec. 23, 2008

(87) PCT Pub. No.: WO2007/107404
PCT Pub. Date: Sep. 27, 2007

(65) Prior Publication Data
US 2009/0101451 A1   Apr. 23, 2009

(30) Foreign Application Priority Data
Mar. 22, 2006   (DE) .......................... 10 2006 013 216

(51) Int. Cl.
*G01L 1/00* (2006.01)
(52) U.S. Cl. ........................................................ 73/760
(58) Field of Classification Search .................. 73/760
See application file for complete search history.

(56) References Cited

U.S. PATENT DOCUMENTS

| | | | | |
|---|---|---|---|---|
| 4,768,625 A * | 9/1988 | Price et al. | .................... | 188/71.4 |
| 6,249,737 B1 | 6/2001 | Zipp et al. | ........................ | 701/70 |
| 6,533,082 B2 | 3/2003 | Gill et al. | ........................ | 188/156 |
| 6,609,595 B2 | 8/2003 | Flynn et al. | .................... | 188/156 |
| 6,655,507 B2 * | 12/2003 | Miyakawa et al. | ............ | 188/171 |
| 7,341,127 B2 * | 3/2008 | Gil et al. | ........................ | 188/2 D |
| 7,490,699 B2 * | 2/2009 | Gil et al. | ........................ | 188/2 D |
| 2003/0066714 A1 | 4/2003 | Flynn et al. | ....................... | 188/2 |
| 2006/0096812 A1 | 5/2006 | Terradas et al. | ............... | 188/2 D |

FOREIGN PATENT DOCUMENTS

| | | |
|---|---|---|
| DE | 19738877 C2 | 12/1998 |
| DE | 10212879 A1 | 10/2003 |
| DE | 10261127 A1 | 7/2004 |
| DE | 102004025361 A1 | 3/2005 |
| EP | 1211149 B1 | 11/2001 |
| FR | 2592160 A1 | 6/1987 |
| JP | 60128320 | 7/1985 |
| KR | 20060007168 | 1/2006 |
| WO | 9856633 A1 | 12/1998 |
| WO | 2004110835 A1 | 12/2004 |

* cited by examiner

*Primary Examiner* — Lisa M Caputo
*Assistant Examiner* — Octavia Davis
(74) *Attorney, Agent, or Firm* — King & Spalding L.L.P.

(57) ABSTRACT

A force measuring device for a parking brake of a vehicle has a housing, having a Bowden cable for actuating the parking brake and having a force measuring element for determining the cable force. The Bowden cable is guided through the housing and has first and second stops which are fastened to the Bowden cable, wherein under loading of the Bowden cable, the first stop is fixedly supported on a housing inner side and the opposite, second stop is supported on the force measuring element which is provided between the housing and the second stop, wherein a movement of the second stop is generated corresponding to the loading of the Bowden cable, which movement leads, at the force measuring element, to a corresponding measurement value for the force transmitted by the Bowden cable. The force measuring device is provided for parking brakes for passenger vehicles.

20 Claims, 2 Drawing Sheets

FORCE MEASURING DEVICE FOR A PARKING BRAKE OF A VEHICLE, IN PARTICULAR OF A PASSENGER VEHICLE

CROSS-REFERENCE TO RELATED APPLICATIONS

This application is a U.S. National Stage Application of International Application No. PCT/EP2007/050861 filed Jan. 30, 2007, which designates the United States of America, and claims priority to German Application No. 10 2006 013 216.5 filed Mar. 22, 2006, the contents of which are hereby incorporated by reference in their entirety.

TECHNICAL FIELD

The invention relates to a force measuring device for a parking brake of a vehicle, in particular of a passenger vehicle, having a housing, having a Bowden cable for actuating the parking brake and having a force measuring element for determining the cable force.

BACKGROUND

A generic force measuring device is known from WO 98/56633, which is part of a parking brake, namely an electronic parking brake. To ensure problem-free operation of the parking brake, it is necessary to proportion the force to be transmitted by the Bowden cable exactly, for which it is necessary to determine the transmission of force precisely using the force measuring device. The parking brake has a Bowden cable actuating device which has a motorized drive which moves an actuating element linearly via a gear unit and a threaded spindle in order thus to actuate the Bowden cable connected to the actuating element accordingly. A force measuring device having a housing is assigned to the actuating element. The force measuring device is integrated into the actuating element of the Bowden cable actuating device. However, integration requires corresponding installation space and is moreover costly.

The force measurement takes place at the interface between Bowden cable and the actuating element by means of the force measuring device, which to this end has a force measuring element, designed as a spring. By displacing the actuating element using a motorized drive the spring is correspondingly contracted in accordance with the load on the Bowden cable. The spring deflection is recorded electronically by a position sensor. The characteristic curve of the spring is used to determine the force transmitted by the Bowden cable.

A force measuring device is likewise known from U.S. Pat. No. 6,609,595 B2, which is part of a parking brake, namely a parking brake assembly. Here too the force measuring device is integrated inside an actuating element for the Bowden cable. In this case the force measuring device is installed in a bored hole in the actuating element. The force measuring element is designed as a spring, with the spring deflection being determined using a pusher or a Hall sensor. The load on the Bowden cable can then be inferred from the spring deflection.

SUMMARY

According to various embodiments, a force measuring device for a Bowden cable can be provided with a simple and reliable construction and a flexible place of installation.

According to one embodiment, a force measuring device for a parking brake of a vehicle, in particular of a passenger vehicle, may have a housing, a Bowden cable for actuating the parking brake and a force measuring element for determining the cable force, wherein the Bowden cable is guided through the housing and has stops attached to the Bowden cable, a first stop and a second stop, wherein when a load is applied to the Bowden cable the first stop is fixedly supported on an inner side of the housing and the opposite second stop is supported on the force measuring element provided between housing and second stop, wherein in accordance with the load on the Bowden cable a displacement of the second stop is generated, resulting at the force measuring element in a corresponding measurement value for the force transmitted by the Bowden cable.

According to a further embodiment, the stops can be designed in the form of sleeves tightly fitted over the Bowden cable. According to a further embodiment, the force measuring element can be designed to be plate-shaped and is supported on a shoulder on the housing. According to a further embodiment, two opposite shoulders can be designed on the housing. According to a further embodiment, the force measuring element can be fitted with strain gauges and/or with at least one piezo force sensor for force measurement. According to a further embodiment, the force measuring element may have a slot for insertion of the Bowden cable. According to a further embodiment, the force measuring element can be formed by a spring supported on the housing side and by a cup-shaped spring retainer, on which the second stop is supported, wherein depending on the load on the Bowden cable a corresponding spring deflection of the spring is generated, which is determined by a provided spring deflection measuring device and from which a corresponding measurement value for the force in the Bowden cable can be determined. According to a further embodiment, the Bowden cable can be installed loose between the stops. According to a further embodiment, the Bowden cable may have an arc or a loop between the stops.

According to another embodiment, an electromotive parking brake may have a force measuring device as described above.

BRIEF DESCRIPTION OF THE DRAWINGS

Exemplary embodiments are illustrated in simplified fashion in the drawing and are explained in greater detail in the subsequent description.

The drawings show.

DETAILED DESCRIPTION

According to various embodiments, it is proposed to install the force measuring element in the Bowden cable itself, virtually creating a bypass for force measurement. This design enables the force to be measured at any point in the Bowden cable, for example even externally to a Bowden cable actuating device.

The force measuring device is integrated into the Bowden cable, the Bowden cable being guided through the housing of the force measuring device. Fixed stops are provided on the Bowden cable, a first stop and a second stop, the first stop being fixedly supported on an inner side of the housing when a load is applied to the Bowden cable and the opposite second stop being supported on the force measuring element. Depending on the load applied to the Bowden cable the second stop is displaced, thereby producing a corresponding measurement value for the force transmitted by the Bowden cable at the force measuring element between housing and second stop.

It can be especially advantageous that the force measuring device is simple to install on a Bowden cable which is as conventional as possible. The permits great flexibility as regards the design of the Bowden cable actuating device, since the force measuring device can be installed inside the housing of the Bowden cable actuating device or even outside the housing.

In one embodiment the stops are simply designed in the form of sleeves tightly fitted over the Bowden cable.

In a further embodiment the force measuring element is designed to be plate-shaped and is supported on a shoulder on the housing. In particular in combination with a slot to insert the Bowden cable this makes it easy to fit the force measuring element on the Bowden cable.

In a further embodiment the force measuring element is fitted with strain gauges and/or with at least one piezo force sensor for measuring force. This solution permits not only a precise measurement of the force in the Bowden cable, but is also simple and permits the force in the Bowden cable to be determined directly and non-circuitously.

Thanks to a force measuring element formed by a spring supported on the housing side and by a cup-shaped spring retainer, an alternative embodiment of the force measuring element is provided.

Figure 1:
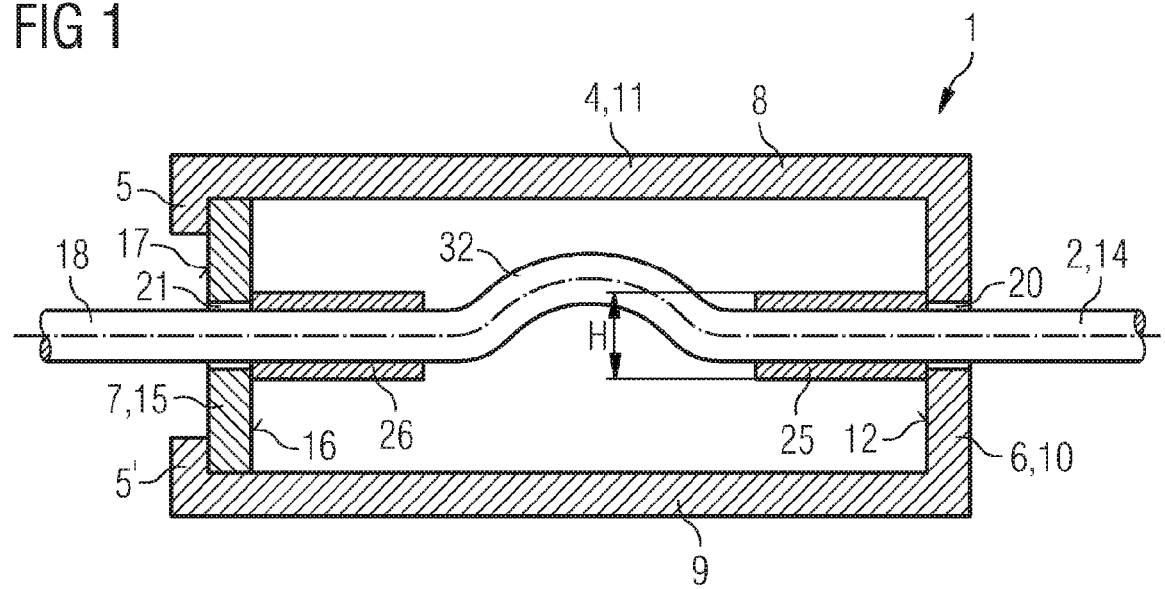
FIG. 1 a side view of a first exemplary embodiment of the force measuring device in cross-section, FIG. 2 a front view of the force measuring device in accordance with FIG. 1 and FIG. 3 a side view of a second exemplary embodiment of the force measuring device in cross-section.

FIG. 1 shows a side view of a first exemplary embodiment of a force measuring device 1 in cross-section. The force measuring device 1 is part of a parking brake, which is known to experts in this field by the term Electronic Parking Brake EPB. The parking brake 1 is provided for vehicles, in particular for passenger vehicles. This new technology replaces the familiar handbrake lever by sophisticated electronics which trigger the handbrake automatically. An inclination sensor recognizes for example when the vehicle is liable to slide downhill and automatically draws the brake shoes together. The brake is also activated when the engine is switched off.

Such a parking brake has a Bowden cable 2 to actuate the parking brake. The Bowden cable 2 can be actuated by a Bowden cable actuating device (not shown in greater detail), which is designed to be electromotive or has a motorized drive in the form of an electric motor. The electric motor drives an actuating element via a gear unit, said actuating element exerting the cable force on the Bowden cable required to actuate the parking brake. To this end a threaded spindle driven by the gear unit is normally provided, which is connected to the actuating element and displaces the actuating element linearly. Displacing the actuating element in turn results in an actuation or displacement of the Bowden cable and thus of the parking brake.

To proportion the braking force of the parking brake it is necessary to precisely determine the load or tensile force prevailing in the Bowden cable 2 by means of the force measuring device 1. The force measuring device 1 has an elongated, cylindrical or, as shown, cuboidal housing 4. The housing 4 has an elongated housing section 11 and two sides, a first side 6 on the right of FIG. 1 and a second side 7 on the left of FIG. 1. The first side 6 represents a side section 10 of the elongated housing section 11 and is designed as a single part with the elongated housing section 11. It is of course also possible to design the first side 6 as a separate side section and to connect it to the elongated housing section 11 using corresponding fastening means. The second side 7 is essentially formed by a force measuring element 15.

Figure 2:
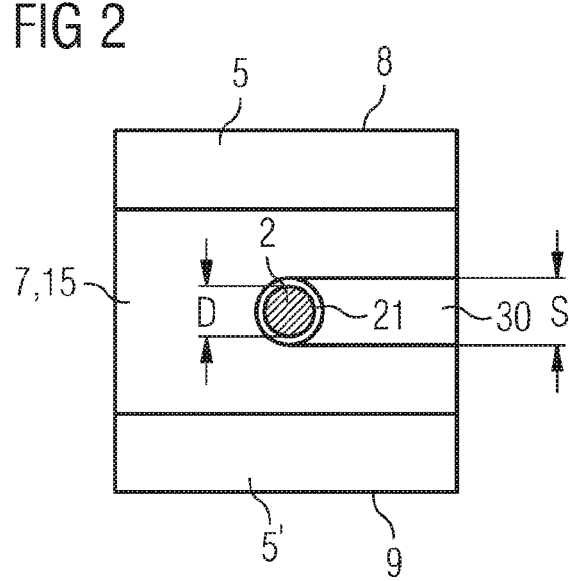

The second side 7 or the force measuring element 15 is disk-shaped in the case of a cylindrical housing 4 or is plate-shaped, as shown in greater detail in FIG. 2, a front view of the force measuring device 1, and has a square or rectangular outline. Approximately in the center of the force measuring element 15 or in the center of the sides 6, 7 respective openings 20, 21 are provided, a first opening 20 in the side part 10 of the housing 4 and a second opening 21 in the force measuring element 15. Both openings 20, 21 serve as lead-throughs for the Bowden cable 2 and hence have an opening cross-section which is somewhat larger than a cross-section of the Bowden cable 2.

Inside the housing 4 the Bowden cable 2 has two stops, a first stop 25 on the right of FIG. 1 and a second stop 26 on the left of FIG. 1. Both stops 25, 26 are designed for example in the form of sleeves or press rings tightly fitted over the Bowden cable 2. Other forms for the stops 25, 26 are of course also possible. It is also conceivable to provide centering collars on the components 10, 15 abutting the stops 25, 26. When a load is applied to the Bowden cable 2 the first stop 25 is firmly supported on a housing inner side 12 of the side section 10 of the housing 4 and the opposite second stop 26 is supported on the inner side 16 of the force measuring element 15.

The outer side 17 of the force measuring element 15 opposite the force measuring element 15 is supported on a shoulder 5 or overlap formed on the second side 7 of the housing 4. In the case of a cylindrical housing 4 the force measuring element 15 is disk-shaped and the shoulder 5 is designed circumferentially as an annular web. The annular web of the shoulder 5 covers the outer side 17 of the force measuring element somewhat, so that the force measuring element 15 is supported on an annular surface on the housing 4 when a tensile load is applied to the Bowden cable 2. In the case of a cuboidal housing 4 the force measuring element 15 is designed as a correspondingly rectangular or square element. As shown in greater detail in FIG. 2, the second side 7 of the housing 4 has two opposite shoulders 5, 5' or overlaps. Both shoulders 5, 5' are provided opposite for example an upper housing elongated side 8 and a lower elongated side 9 of the housing 4 and accommodate the force measuring element 15 on its two sides in virtually disk-shaped fashion in the housing 4. Above and below, the rectangular or square force measuring element 15 then abuts two rectangular contact surfaces of the shoulders 5, 5' on the housing 4.

The force measuring element 15 has a slot 30 which extends laterally approximately as far as the center of the force measuring element 15. The slot 30 has a slot width S which is larger than a diameter D of the Bowden cable 2 and smaller than a diameter H of the sleeves 25, 26 of the Bowden cable 2. During installation this permits a lateral insertion of the Bowden cable 2, which when a load is applied to the Bowden cable 2 is then supported on the inner side 16 of the force measuring device with its sleeve 26 fixed to the Bowden cable 2. The force measuring device 1 is installed subsequent to the manufacture of the Bowden cable 2, an end of the Bowden cable 2 initially being inserted into the first opening 20 on the right side section 10 and the first stop 25 abutting the inner side 12 of the housing. The second stop 26 is then inserted into the installation slot 30 of the force measuring element 15 held in the housing 4 for example by light press fit. The Bowden cable 2 thus requires only two fixed stops 25, 26. The distance between the stops 25, 26 is here selected such that excess Bowden cable path is present or an arc 32 is present between the stops 25, 26 in the installed state of the Bowden cable 2 or a loop is formed. Because of the arc 32 or the loop the tensile force in the Bowden cable 2 is interrupted between the stops 25, 26, which is thereby bypassed by the housing 4 of the force measuring device 1.

Both stops 25, 26 lie in a line or axis with no transverse offset. The force is transmitted from a cable section 14 on the right on a first stop 25 via the right-hand side section 10 of the housing 4 to the elongated housing section 11 and via the stops 5, 5' to the force measuring element 15 and from there to the second stop 16 to the cable section 18 of the Bowden cable 2 on the left.

Between the stops 25, 26 the Bowden cable 2 is slack or loose and no force is transmitted. The housing 4 transmits the force between the stops 25, 26, so that the force measuring element 15 is installed in the Bowden cable 2 virtually as a bypass. It is also possible to dispense with the slot 30 and to provide only one opening or bored hole on the force measuring element 15. The manufacturer of the Bowden cable can then thread the Bowden cable 2 with the first stop 25 into the first opening 20 in the housing 4 and with the second stop 26 into the second opening (without a slot) in the force measuring element 15 and perform final assembly of the force measuring device 1 with the Bowden cable 2.

Depending on the load on the Bowden cable 2, the second stop 26 and thereby the force measuring element 15 is displaced accordingly. To measure force the force measuring element 15 has for example strain gauges DMS not shown in greater detail and is designed as a bending beam. The DMS are electrical resistors dependent on deformation and can be applied to the force measuring element 15 using thin-layer or thick-layer technology. It is also possible to install a piezo force sensor in addition to or instead of the DMS, which converts a corresponding deformation into a corresponding electrical signal. In the case of the piezo effect a marginal deformation of a crystal delivers a corresponding electrical charge. Other known embodiments for force measurement can of course also be used on the force measuring element 15, such as Hall sensors for example.

The output signals from the DMS or the piezo force sensor can be applied to a control or regulation device for driving the Bowden cable actuating device. By comparing the target force values with the actual force values it is then possible to control or regulate the parking brake in known fashion.

Figure 3:
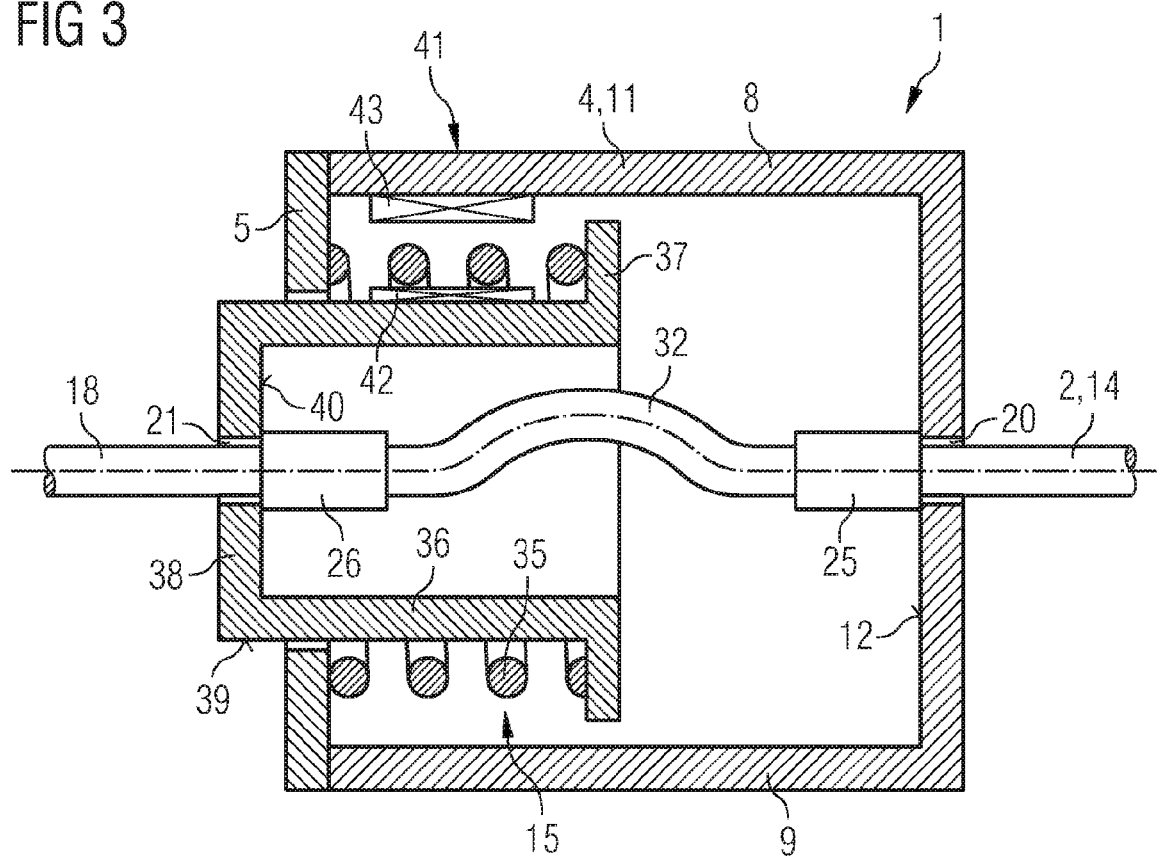

FIG. 3 shows a second exemplary embodiment in which all identical components or those serving the same function are characterized with the same reference characters. As FIG. 3, a side view of the force measuring device 1 in cross-section, shows, the force measuring element 15 is alternatively designed as a spring 35 with an internal cup-shaped spring retainer 36. The spring 15 is supported on the housing side on the circumferential shoulder 5 of the housing 4 shown on the left and opposite a circumferential edge 37 of the cup-shaped spring retainer 36. The shoulder 5 can be designed as an overlap and, as shown, can be a separate component which is connected to the elongated housing section 11. The left-hand cable section 18 of the Bowden cable 2 is guided through the second opening 21 provided in a base 38 of the spring retainer 36. The shoulder 5 approximately terminates radially in a lateral surface 39 of the cup-shaped spring retainer 36. The spring retainer 36 is movable and the second stop 26 is supported on an inner surface 40 of the base 38. Both stops 25, 26 run, as shown here, not in a line or along an axis, but have a transverse offset. In a further embodiment the two stops 25, 26 are arranged in an axis. Depending on the load applied to the Bowden cable 2 a corresponding spring deflection is generated, which is determined by a predefined, for example electronically embodied, spring deflection measuring device 41 and from this produces a corresponding measuring value for the force in the Bowden cable 2.

The spring deflection measuring device 41 is for example fitted on the inside of the elongated housing section 11 near the spring 35. In the case of the spring deflection measuring device 41 this is a standard component for determining spring deflection which can for example have a magnetic field sensor which correspondingly affects a position sensor.

The spring deflection measuring device has a magnet 42 on the spring retainer. Opposite the magnet 42 a Hall sensor 43 is fixed to the housing 4, as shown in FIG. 3.

LIST OF REFERENCE CHARACTERS

1 Force measuring device
2 Bowden cable
4 Housing
5 Shoulder
6 First side
7 Second side
8 Upper long side of housing
9 Lower long side of housing
10 Side section
11 Housing section
12 Housing inner side
14 Cable section on the right
15 Force measuring element
16 Inner side of force measuring element
17 Outer side of force measuring element
18 Cable section on the left
20 First opening
21 Second opening
25 First shoulder
26 Second shoulder
30 Slot
32 Arc
35 Spring
36 Spring retainer
37 Edge
38 Base
39 Lateral surface
40 Inner surface
41 Spring deflection measuring device
42 Magnet
43 Hall sensor

The invention claimed is:

1. A force measuring device for a parking brake of a vehicle comprising a housing, having a Bowden cable for actuating the parking brake and having a force measuring element for determining the cable force, wherein the Bowden cable is guided through the housing and has first and second stops attached to the Bowden cable, wherein when a load is applied to the Bowden cable the first stop is fixedly supported on an inner side of the housing and the opposite second stop is supported on the force measuring element provided between housing and second stop, wherein in accordance with the load on the Bowden cable a displacement of the second stop is generated, resulting at the force measuring element in a corresponding measurement value for the force transmitted by the Bowden cable.

2. The force measuring device according to claim 1, wherein the stops are designed in the form of sleeves tightly fitted over the Bowden cable.

3. The force measuring device according to claim 1, wherein the force measuring element is designed to be plate-shaped and is supported on a shoulder on the housing.

4. The force measuring device according to claim 3, wherein the force measuring element is fitted with at least one of strain gauges and at least one piezo force sensor for force measurement.

5. The force measuring device according to claim 3, wherein the force measuring element has a slot for insertion of the Bowden cable.

6. The force measuring device according to claim 1, wherein two opposite shoulders are designed on the housing.

7. The force measuring device according to claim 1, wherein the force measuring element is formed by a spring supported on the housing side and by a cup-shaped spring retainer, on which the second stop is supported, wherein depending on the load on the Bowden cable a corresponding spring deflection of the spring is generated, which is determined by a provided spring deflection measuring device and from which a corresponding measurement value for the force in the Bowden cable can be determined.

8. The force measuring device according to claim 1, wherein the Bowden cable is installed loose between the stops.

9. The force measuring device according to claim 8, wherein the Bowden cable has an arc or a loop between the stops.

10. An electromotive parking brake having a force measuring device comprising a housing, having a Bowden cable for actuating the parking brake and having a force measuring element for determining the cable force, wherein the Bowden cable is guided through the housing and has first and second stops attached to the Bowden cable, wherein when a load is applied to the Bowden cable the first stop is fixedly supported on an inner side of the housing and the opposite second stop is supported on the force measuring element provided between housing and second stop, wherein in accordance with the load on the Bowden cable a displacement of the second stop is generated, resulting at the force measuring element in a corresponding measurement value for the force transmitted by the Bowden cable.

11. The electromotive parking brake according to claim 10, wherein the stops are designed in the form of sleeves tightly fitted over the Bowden cable.

12. The electromotive parking brake according to claim 10, wherein the force measuring element is designed to be plate-shaped and is supported on a shoulder on the housing.

13. The electromotive parking brake according to claim 12, wherein the force measuring element is fitted with at least one of strain gauges and at least one piezo force sensor for force measurement.

14. The electromotive parking brake according to claim 12, wherein the force measuring element has a slot for insertion of the Bowden cable.

15. The electromotive parking brake according to claim 10, wherein two opposite shoulders are designed on the housing.

16. The electromotive parking brake according to claim 10, wherein the force measuring element is formed by a spring supported on the housing side and by a cup-shaped spring retainer, on which the second stop is supported, wherein depending on the load on the Bowden cable a corresponding spring deflection of the spring is generated, which is determined by a provided spring deflection measuring device and from which a corresponding measurement value for the force in the Bowden cable can be determined.

17. The electromotive parking brake according to claim 10, wherein the Bowden cable is installed loose between the stops.

18. The electromotive parking brake according to claim 17, wherein the Bowden cable has an arc or a loop between the stops.

19. A method for force measuring for a parking brake of a vehicle with a Bowden cable for actuating the parking brake and a force measuring element for determining the cable force, wherein the Bowden cable is guided through the housing and has first and second stops attached to the Bowden cable, the method comprising the steps of:
when a load is applied to the Bowden cable, supporting the first stop fixedly on an inner side of the housing and supporting the opposite second stop on the force measuring element provided between housing and second stop,
generating in accordance with the load on the Bowden cable a displacement of the second stop, resulting at the force measuring element in a corresponding measurement value for the force transmitted by the Bowden cable.

20. The method according to claim 19, comprising the steps of forming the force measuring element by a spring supported on the housing side and by a cup-shaped spring retainer, on which the second stop is supported, wherein depending on the load on the Bowden cable a corresponding spring deflection of the spring is generated, which is determined by a provided spring deflection measuring device and from which a corresponding measurement value for the force in the Bowden cable can be determined.

* * * * *